Oct. 6, 1959  H. PH. G. A. R. VON ZBOROWSKI  2,907,536
ANNULAR WING FLYING MACHINE AND METHOD OF FLYING SAME
Filed Dec. 16, 1955  5 Sheets-Sheet 1
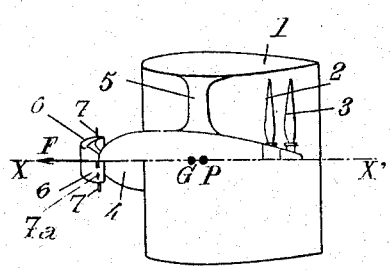
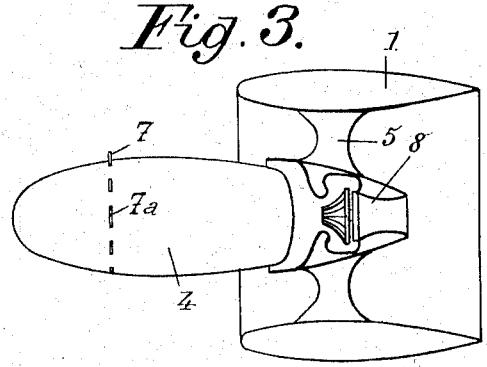
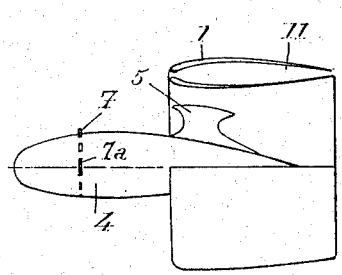
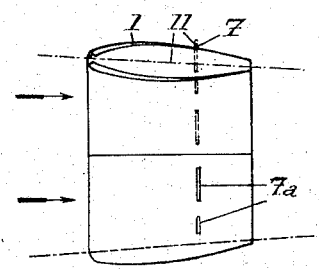
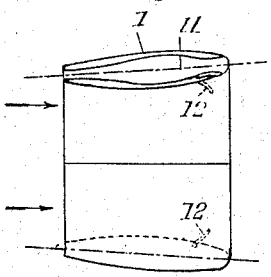
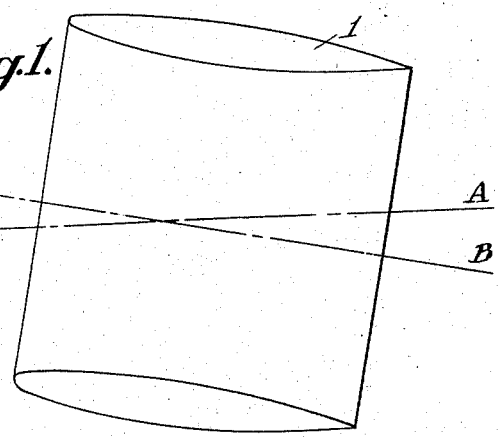
INVENTOR
HELMUT PH. G.A.R. VON ZBOROWSKI
BY
ATTORNEYS Oct. 6, 1959    H. PH. G. A. R. VON ZBOROWSKI    2,907,536
ANNULAR WING FLYING MACHINE AND METHOD OF FLYING SAME INVENTOR
HELMUT PH. G.A.R. VON ZBOROWSKI
BY
Bailey Stephens and Huettig
ATTORNEYS Oct. 6, 1959   H. PH. G. A. R. VON ZBOROWSKI   2,907,536
ANNULAR WING FLYING MACHINE AND METHOD OF FLYING SAME
Filed Dec. 16, 1955   5 Sheets-Sheet 3

INVENTOR
HELMUT PH. G.A.R. VON ZBOROWSKI
BY
Bailey Stephens and Huttig
ATTORNEYS Oct. 6, 1959   H. PH. G. A. R. VON ZBOROWSKI   2,907,536
ANNULAR WING FLYING MACHINE AND METHOD OF FLYING SAME
Filed Dec. 16, 1955   5 Sheets-Sheet 4

INVENTOR
HELMUT PH. G.A.R. VON ZBOROWSKI
BY
Bailey Stephens and Huettig
ATTORNEYS Oct. 6, 1959  H. PH. G. A. R. VON ZBOROWSKI  2,907,536
ANNULAR WING FLYING MACHINE AND METHOD OF FLYING SAME
Filed Dec. 16, 1955  5 Sheets-Sheet 5

INVENTOR
HELMUT PH. G.A.R. VON ZBOROWSKI
BY
Bailey, Stephens and Huettig
ATTORNEYS

United States Patent Office 2,907,536
Patented Oct. 6, 1959

2,907,536

ANNULAR WING FLYING MACHINE AND METHOD OF FLYING SAME

Helmut Ph. G. A. R. von Zborowski, Chateau de Boussy St. Antoine par Brunoy, France Application December 16, 1955, Serial No. 553,604

Claims priority, application France October 4, 1950

15 Claims. (Cl. 244—12)

The invention relates to flying machines, and more particularly to such machines having substantially annular lift-producing surfaces forming the whole aerodynamic supporting part of the machine.

The primary object of the invention is to provide a machine which operates more easily than conventional machines. More particularly, the invention contemplates a machine which can make turns without banking, so that the complicated manipulation of the controls which is necessary in ordinary aircraft is not required.

Another object of the invention is to provide a machine which is inexpensive in construction and can be built more cheaply than ordinary aircraft of equal performance.

A further object of the invention is to provide a flying machine capable of traveling at high speeds, including supersonic speeds.

Still another object of the invention is to provide a flying machine capable of taking off and landing vertically and of flying horizontally between take-offs and landings.

The invention in general contemplates the provision of an annular wing structure of air-foil cross-section, symmetrical about its longitudinal axis, this annular wing structure comprising substantially the whole lift-producing surface of the machine, in combination with a power plant exerting a propelling thrust along the axis of the annular wing structure. The machine is capable of flying in level flight, since it is provided with aerodynamic control members capable of maintaining it at a positive angle of incidence with respect to its trajectory, and with a power plant of sufficient power to drive it at sufficient speed at such positive angle of incidence as to produce a lift at least equal to the weight of the machine.

For a machine capable of vertical take-off, the power plant should exert a thrust greater than the weight of the machine.

In its preferred forms, the machine according to the invention has a power plant which has its rear end in front of the trailing edge of the annular wing structure, and more especially a thermal power plant (internal combustion engine driving a propeller, turbo-prop, turbo-jet, ramjet or thermonuclear device) which produces hot gases in one form or another, these gases being delivered into or formed in the interior of the annular wing at an intermediate point thereof.

It is also preferable, according to the invention, to locate the aerodynamic control surfaces which maintain the annular wing at a positive angle of incidence to its trajectory towards the front end of the machine, or at least in front of the trailing edge of the wing. Spoilers are particularly appropriate as such control surfaces.

This application is a continuation in part of my prior applications S.N. 242,491, filed August 18, 1951 and S.N. 325,074, filed December 10, 1952, both now abandoned.

Further objects and advantages of the invention will appear more fully from the following description, especially when taken in conjunction with the accompanying drawings which form a part thereof.

In the drawings:

Figure 1 is a diagram showing the operation of a machine according to the invention;

Figure 2 shows in side view, with parts in section, a flying machine embodying the invention;

Figures 3 to 8 are similar views of modified forms of the invention;

Figure 7:
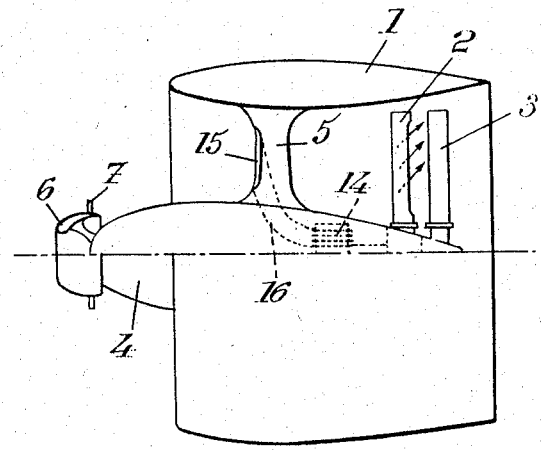

Figure 1 shows schematically the operation of a flying machine according to my invention. The machine which include an annular wing is flying in a horizontal straight line A—A in the direction indicated by the arrow. The thrust of the power plant is exerted along the longitudinal axis B—B of the wing, and the controls are operated in such a way as to maintain the axis B—B at a positive angle of incidence $\alpha$ (which may, for example, be between 3° and 10°) to the trajectory A—A. The power plant has sufficient thrust to cause the wing, under these conditions, to exert a lift at least equal to the weight of the machine (including, of course, the load). In this way, the machine may fly in a level path.

Preferably the power plant has sufficient thrust to enable the machine to make a vertical take-off, that is, the thrust is greater than the weight of the machine.

Figure 2 shows an aircraft embodying the invention. This includes an annular wing 1 of air-foil cross-section, within which are mounted two counter-rotating propellers 2, 3 driven by a suitable power plant, such as an internal combustion engine, contained in fuselage 4. The longitudinal axis of the fuselage coincides with the longitudinal axis X—X' of the annular wing 1, and the thrust F of propellers 2, 3 likewise coincides with this axis. The fuselage is mounted in the center of the annular wing by streamlined radial arms 5, thus providing a substantially annular streamlined passage between the fuselage and the inner wall of the wing.

The annular wing 1 has a surface of revolution generated by the revolution of an elongated plane wing profile figure about the principal axis X—X' of the aircraft which principal axis is external to the wing profile figure and is generally parallel to the direction of its elongation.

The fuselage 4 has an external surface of circular configuration in transverse section and is spaced from the wing member 1 the center of the circular configuration being coaxial with the principal axis X—X' of the aircraft. As shown in Figure 1, the fuselage is disposed within the annulus of the annular wing 1 and protrudes forwardly therefrom.

Mounted at the front of fuselage 4 is a nose ring 6 having radially retractable spoilers 7 extending therefrom.

By selecting the proper spoilers 7, the whole machine may be caused to maintain a positive angle of incidence to its trajectory great enough, under the thrust supplied by the power plant, to cause the wing to exert a lift at least equal to the weight of the machine, so that it can fly in a horizonal line. If desired, spoilers 7 may be mounted for either outward projection from, or inward projection into, ring 6, so as to use the cumulative effect of several spoilers. Spoilers 7, the number of which is higher than three and which are distributed at regular intervals around the periphery of ring 6, are advantageously located in the rear half of said ring, for instance at about three fourths of its depth from its leading edge.

Such a machine has substantial advantages over the conventional machine with generally flat wings.

From the aerodynamic point of view, a conventional aircraft when flying along a straight horizontal line uses the whole wing area in the best possible way to sustain the aircraft in the air. In these conditions of flight and if no other considerations are taken into account, this is a superiority of flat wings over tunnel-shaped or annular wings, because in a tunnel-shaped wing, flying in the same conditions, the lift obtained with a given wing area is smaller (this being due to the fact that only the top and bottom portions of a tunnel-shaped wing are horizontal and give the maximum lift per unit of area, whereas the side portions are vertical and give no lift at all and the intermediate portions give a lift per unit of area equal to only the vertical component of the aerodynamic forces exerted on said wing portions).

But an aircraft is intended also to take turns and in a turn a conventional aircraft must be banked in order to obtain from the air reaction the centripetal force necessary to prevent skidding. The lift must then be divided into a sustaining force and a centripetal force, so that to obtain the necessary sustaining force the total lift must be increased by pitching the aircraft upward.

Therefore it is necessary to produce and to coordinate three different motions: banking, yawing and pitching. This is delicate and involves some time of response when the maneuver is to take place.

Now, with a tunnel-shaped wing, any rotation about its longitudinal axis leaves the wing, from the aerodynamic point of view, exactly as it was initially. In other words, banking does not occur, nor is it necessary because when a machine composed of a tunnel-shaped wing makes a turn, the portions of the wing which, in straight flight, supplied only a lift equal to the vertical component of the aerodynamic force acting thereon now further supply a centripetal force equal to the horizontal component of such aerodynamic force. Thus the wing area is fully utilized, the centripetal force necessary for making a turn not being obtained at the cost of a reduction of the lift existing when flying in straight line. This lift remains unchanged and during the turn the aircraft has no tendency to dive below the level at which it was flying before the turn. No upward pitching of the aircraft is required.

Therefore, with a tunnel-shaped wing a single operation, yawing, is necessary to make a turn. The complication of making three different operations as in a conventional aircraft, and the difficulty of coordinating them are avoided. The time of response is reduced. Piloting is easier and maneuverability is increased.

These qualities are valuable in all cases, whether the aircraft is piloted by man or is a guided missile. But in the case of a guided missile they involve further advantages.

First, it stands to reason that a shortened time of response to orders will facilitate the construction of the order transmitting and receiving means to be provided in the case of a guided missile.

Secondly, since only one motion is to be controlled (yawing) for making a turn, said order transmitting and receiving means will be greatly simplified in the case of a missile composed of a tunnel-shaped wing.

These qualities are so desirable that many guided missiles are made with a cruciform wing (that is, one including two planes at right angles to each other and intersecting each other along the longitudinal axis of the aircraft). But cruciform wings are imperfect solutions and do not give as good results as a tunnel-shaped wing can give. And, what is more important, they are very heavy and, if dimensioned to give results similar to those obtained with a tunnel-shaped wing, their drag is greater while they are devoid of the advantages which more than compensate, in the case of a tunnel-shaped wing, for the drawback of a greater drag.

Another advantage of tunnel-shaped wings applies to the case of vertical take-off aircraft.

An aircraft of conventional construction ready to take-off vertically, that is to say with its fuselage upright, has a relatively large wing area which, if exposed to the action of a wind at right angles to the wing surface, may involve serious dangers. The plane must therefore be positioned in accordance with the direction of the wind, which is a serious complication.

On the contrary, a tunnel-shaped wing always undergoes the same thrust from a wind of given strength at right angles to its axis, regardless of the direction of the wind. The installation for supporting the aircraft in upright position can thus be made very simple.

There are also advantages from the point of view of ease, simplicity and cheapness of construction.

A flat wing is a two-dimensional structure and therefore, in order to obtain the desired rigidity, involves a relatively heavy construction. It is obvious that a tunnel-shaped wing, which is a three-dimensional structure, can be given the same rigidity with a much lighter construction. To obtain the same performance and the same safety coefficient as with a given flat wing, it is possible to build a tunnel-shaped wing of much lighter construction. The gain may be as high as 40%.

It is also easier to avoid aero-elastic phenomena (flutter of the wing skin) in the case of a tunnel-shaped wing than in that of a flat wing.

The construction of a tunnel-shaped wing of circular cross-section is simpler and of lower cost than that of a plane wing because the air-foil section is the same along the circumference of the wing and the transverse frames are of circular shape.

If all these advantages are taken into account, the tunnel-shaped wing is much more advantageous than the conventional plane wing. In particular, although a tunnel-shaped wing of given effective lift has a higher drag than a plane wing of the same lift, the fact that an annular wing can be built much lighter than a plane wing capable of performing the same operations more than compensates for this higher drag and gives the advantage to the machine composed of a tunnel-shaped wing.

Certain dimensions and values are desirable in obtaining the best results according to the invention, although these are not necessarily critical.

If W is the weight of the machine, the thrust F is preferably greater than 1.10 W, for example from 1.20 W to 1.50 W.

Furthermore, it is advantageous to provide a load per unit of area of the supporting wing 1 which ranges from 75 to 200 kgs. per sq. metre, this load having preferably a value averaging 150 kgs. per sq. m. The supporting surface is, in this case, equivalent to twice the product of the mean diameter of the annular wing by its depth (that is, the distance from the leading edge to the trailing edge thereof).

Preferably, the supporting wing 1 is made to comply with the following conditions which remain advantageous (in particular for easily exceeding transonic speeds and for a reduced specific fuel consumption).

The ratio of the outlet cross section of the gaseous stream flowing through the passage of wing 1 to the inlet cross section of said gaseous stream is about 1:1, either by suitable construction of the wing, or by the use of adjusting means which preferably influence the outlet section.

In this last case, advantageously, the adjustment means can be moved to such a degree that this ratio is lower than 1:1, for instance ranging from 0.6:1 to 0.9:1 when flying at cruising speed and can be opened to such a degree that said ratio reaches a value substantially higher than 1:1, for instance averaging 1.20:1 at take-off.

The aspect ratio of the wing system (ratio of diameter to depth) is as a rule not very different from 1:1. It may be as low as 0.5:1 or as high as 2:1 or 3:1.

In the embodiment of my invention illustrated by Figure 3, the power plant is constituted by a turbo-jet 8 and the control surfaces 7 are carried not by an auxiliary ring but directly by fuselage 4.

In the embodiment illustrated by Figure 4, the power plant, instead of being carried by fuselage 4, is mounted in annular wing 1, this power plant being constituted, in this case, by a plurality of ram-jets 11 distributed at regular intervals along the circumference of said wing 1.

I might also dispense with the central fuselage and constitute the flying machine by an annular flying wing in which jet power plants such as ram jets 11 would be suitably distributed, at equal intervals from one another.

Arrangements of this kind are illustrated by Figures 5 and 6, Figure 5 relating to the case of a subsonic wing and Figure 6 to that of a supersonic wing.

Automatic stability of tunnel-shaped wings according to my invention may be improved as follows:

In the case of a subsonic aircraft (Figure 5), the chords of the axial sections of the wing converge slightly toward the rear.

In the case of a supersonic aircraft (Figure 6), these chords converge, on the contrary, toward the front.

In both cases, control means such as spoilers 7 (Fig. 5) or flaps (Fig. 6) are provided to give the annular wing the desired incidence. Such means may act to modify the direction of the air flow either on the outside of the wing or on the inside thereof (i.e. in the tunnel space circumscribed by said wing) and/or to modify the direction of the propulsion jet. This controlling action is obtained by actuating in the same direction control elements disposed in diametrically opposed directions.

If these control elements are on the contrary actuated in opposed directions respectively (i.e. symmetrically with respect to the axis of the wing) they make it possible to modify the ratio of the cross sectional area of the tunnel space inside the wing at the leading edge thereof to the cross sectional area at the trailing edge.

Figure 7 shows a construction which combines airscrew propulsion and ram-jet propulsion. The hot gases from an internal combustion engine 14 serve to heat the air flowing through the annular space between fuselage 4 and wing 1 so as to produce a ram-jet effect. This embodiment is also intended for subsonic speeds. The combustion air for feeding engine 14 is admitted, through inwardly directed slots 15 in each of a plurality of radial arms 5 and a conduit 16, to the internal combustion engine 14.

Figure 8:
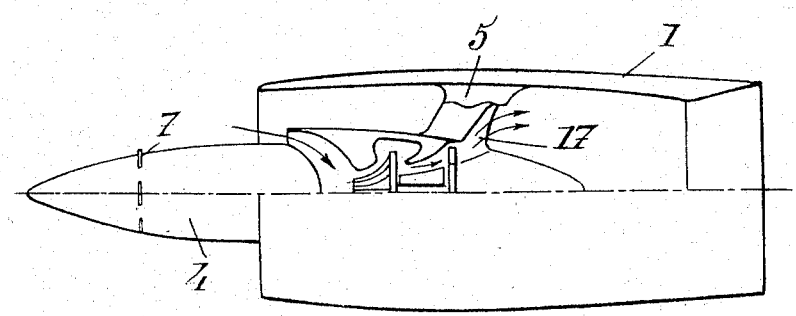

Figure 8 similarly combines turbo-jet propulsion and ram-jet propulsion. Hot gases from the turbine serve to heat the mass of air flowing between the fuselage and the annular wing, thus producing the desired ram-jet effect. Figure 8 shows a construction for supersonic speeds.

Figure 9:
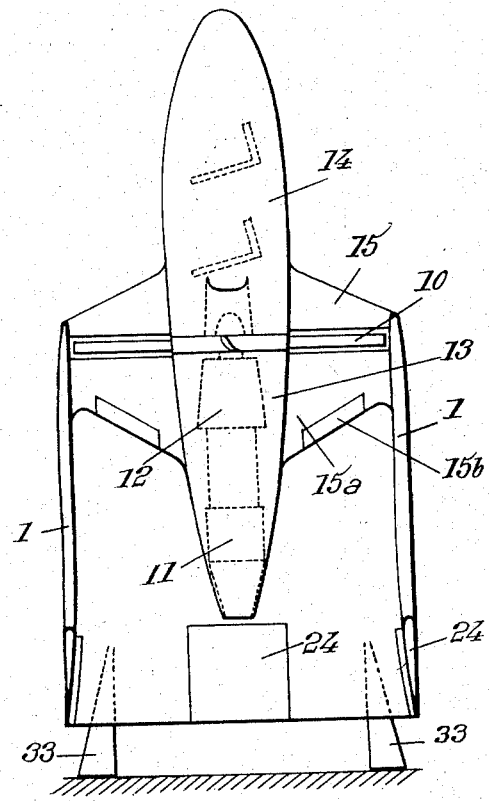
Figure 9 shows, partly in section, a machine according to the invention intended for vertical take-off.
Figure 11:
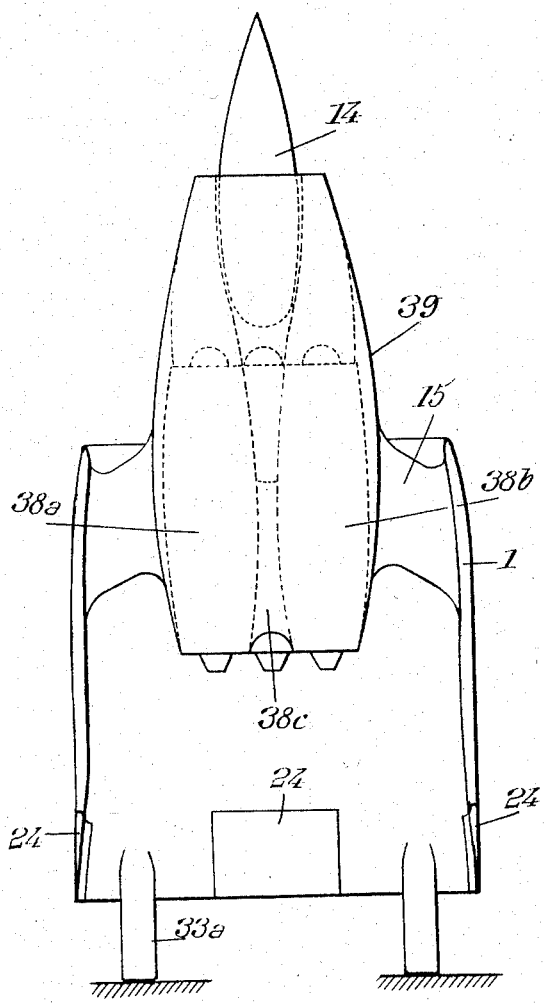
Figure 11 shows, similarly to Figure 9, a modified form of machine.

In order to reinforce this effect, it may be advantageous, as shown by Figures 8, 9 and 11, to give the wing axial sections asymmetrical airfoil shapes and to reduce the thickness with respect to the chord so as to obtain the axial length necessary to achieve a good mixing of the hot gases with the air stream.

This mixing is facilitated when, as shown by Figure 7, the hot exhaust gases pass through the hollow blades of propeller 2. I may, to obtain this advantage, provide hollow airscrews for this purpose. In the construction of Figure 8, the hot gases from the turbine escape through conduits 17 provided in supporting arms 5, so as to obtain the same result.

The machines of Figures 9 to 14 are especially designed for vertical take-off.

The propelling plant of the machine is housed, as above indicated, inside the tunnel formed by main wing 1. The propelling plant may include at least one airscrew 10, the efficiency of which is increased by the fact that it works inside a fairing or tunnel where the flow of air is always subsonic.

It is possible to have this propeller driven by an electric motor fed with current from a source which may be located at the ground station (case of an observation aircraft intended merely to rise in the air above this station and which may be connected thereto by a cable).

But I may also make use of a thermal engine of the supercharged type which may be in particular, either a piston engine, advantageously of the type in which water and methanol are injected, or a gas turbine, preferably cooled internally by means of a liquid.

It will be advantageous, in the first case, to adopt a feed pressure of at least 2.5 atmospheres and, in the second case, to make use of a compressor having a ratio of compression at least equal to 10:1.

Figure 10:
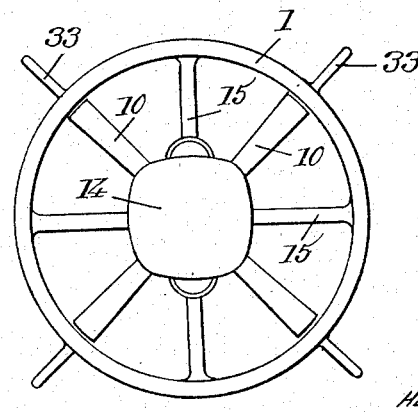
Figure 10 is a top plan view thereof.

Figures 9 and 10 show a propeller plant of the turbine type, the turbine being shown at 11 and the compressor at 12. This system is housed in a streamlined body 13 which constitutes an extension toward the rear of the cabin 14 of the machine, said streamlined body 13 being connected through streamlined radial arms 15 with the main wing 1.

As to the steering controls, they are preferably arranged in such manner that they act both on the propelling jet and on the external flow, for which purpose for instance, I provide along the trailing edge of main wing 1 a plurality of flaps 24 the control means of which are arranged in such manner that two diametrally opposed flaps are constantly nearly parallel to each other. One of the flap then acts chiefly on the external flow whereas the other acts chiefly upon the internal flow.

The cabin of the machine, which is preferably coaxial with the annular wing and which is advantageously disposed ahead of said wing, may be capable of being dropped and supported by a parachute, said cabin then constituting an autonomous element.

This cabin may advantageously be reinforced and have a shell-like structure, preferably with a shape of revolution.

The seats provided in the cabin may be pivotable and have in particular an amplitude of adjustment of at least 45°, in order to enable the passengers to occupy a comfortable position both for horizontal flying and for the taking off or landing operations.

When the apparatus is to be provided with fire-arms, for instance guns or rockets, these arms may be mounted inside the annular wing 1 (advantageously in the leading edge thereof, in which case the different arms are preferably distributed at regular intervals at the periphery of said leading edge), or on the inside of radial arms 15 which extend between said wing 1 and the central body. In this last case, the arms are preferably located close to the central body.

Furthermore, when the firearms are located in the radial arms, they are preferably disposed at a distance from the axis of the machine such that, while converging toward the point of concentration which has been previously imposed, said arms have their axes substantially parallel to the air stream lines which circulate in their vicinity; thus, the presence of the arms will disturb the air flow to a minimum.

The aircraft of Figures 9 and 10 is an army cooperation airplane designed to fly at subsonic speeds.

The trailing edge portion of annular wing 1 is provided with rearwardly projecting fins 33 upon which the airplane is supported when it is resting on the ground. In this construction, as shown by Figure 10, these parts 33 extend outwardly so as to form radial fins.

In addition to arms 15, I provide rearwardly of propeller 10, radial arms 15a which serve both to support the fuselage and to guide the air leaving propeller 10.

When a single propeller is used, these arms 15a are arranged to compensate for the torque created by this propeller.

Furthermore these arms 15a carry control means 15b to produce a torque about the wing axis when so desired.

Figure 12:
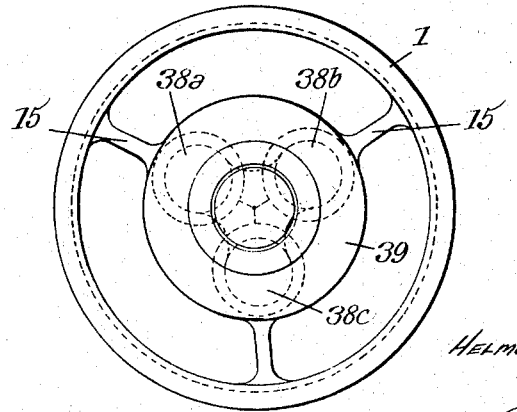
Figure 12 is a top plan view thereof.

The aircraft of Figures 11 and 12 is a fighter. Its power plant includes three turbo-jets 38a, 38b, 38c, enclosed in a casing 39 located at the rear of the cabin 14.

A ram-jet propulsion effect is obtained due to the fact that the hot exhaust gases from said turbo-jets are delivered into the space limited by the inner wall of annular wing 1. The machine is supported in vertical position by legs 33a.

Figure 13:
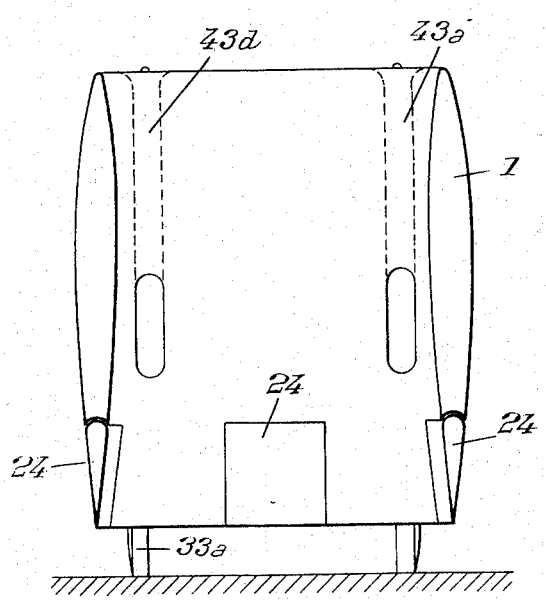
Figure 13 is a view similar to Figure 9 of still a further modification.
Figure 14:
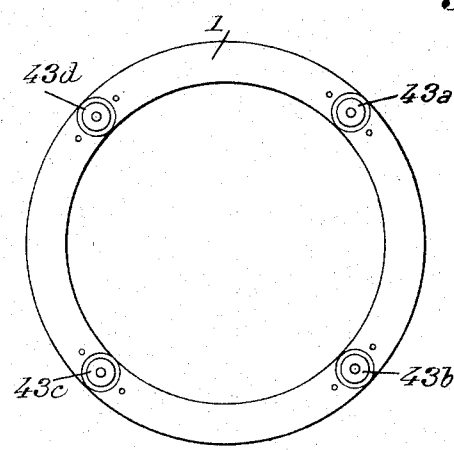
Figure 14 is a top plan view thereof.

The aircraft of Figures 13 and 14 is a long range transport plane designed to fly at subsonic speeds. Its power plant is constituted by four turbo-jets 43a, 43b, 43c, 43d mounted in the annular wing 1. The cabin is also housed in this wing.

The term "intrinsic axis" of the thrust means the axis of the thrust under normal conditions when not deflected by control surfaces such as flaps 24.

It will be clear that the thrust exerted by the power plant is balanced with respect to at least one plane through the longitudinal axis, so that it has no tendency to rotate the wing about this axis. For example, the thrust in Fig. 11 is balanced with respect to a vertical plane passing through the longitudinal axis and through the axis of one of the jet units.

While I have described herein some embodiments of my invention, I wish it to be understood that I do not intend to limit myself thereby, except within the scope of the claims hereto or hereinafter appended.

What I claim is:

1. An aircraft comprising a lift producing structure substantially of revolution about its longitudinal axis, said lift producing structure comprising an annular wing of airfoil shaped chordwise section and having a longitudinally extending streamlined passage of substantial cross-section through the annular wing, said annular wing having an aspect ratio of at least 0.5:1, the inner wall of said annular wing forming the outer wall of said passage, power plant means incorporated in said structure and fixedly carried thereby for producing a thrust, the intrinsic axis of which thrust coincides substantially with said longitudinal axis and which thrust is balanced about at least one plane which includes said axis, said lift producing structure producing at a predetermined positive angle of incidence of said axis with respect to the trajectory of the aircraft in the air and at a speed within the power range of the power plant means a lift the vertical component of which is at least equal to the weight of the aircraft, means carried by said structure adapted to create in normal flight a transverse force applied to said structure in a radial plane thereof fixed with respect thereto to give the longitudinal axis thereof a constantly positive incidence relative to the trajectory of the aircraft, said lift producing structure and said force producing means being substantially the sole aerodynamic lifting instrumentality of the aircraft.

2. An aircraft as claimed in claim 1 in which said force producing means are located at least as far forward as the trailing edge of the annular wing.

3. An aircraft as claimed in claim 1 in which said force producing means comprises flaps constituting portions of the trailing edge of the annular wing.

4. An aircraft according to claim 1 in which said power plant means includes at least one airscrew located inside the space limited by the inner wall of the wing.

5. An aircraft according to claim 1 in which said power plant means includes an airscrew rotating about said axis and transmitting to said aircraft a torque about said axis, and aerodynamic means carried by said structure for balancing said torque so as to prevent it from rotating about its axis during flight.

6. An aircraft according to claim 1 in which the center of lift of the lift producing structure is located substantially nearer the leading edge than the trailing edge.

7. An aircraft according to claim 1 in which said power plant means comprises at least one jet engine discharging gases at least in part through said passage, and said force producing means includes means for deflecting at least a part of said gases.

8. An aircraft according to claim 1 in which the frontal area of said power plant means is confined within the maximum circumference of said wing.

9. An aircraft according to claim 1 in which said power plant means is a thermal power plant producing hot gas during the operation thereof, and means to conduct said hot gas into said passage at a point intermediate the ends thereof.

10. An aircraft according to claim 1 in which said force producing means are mounted to vary the direction of air flow both on the inside and on the outside of said annular wing.

11. An aircraft according to claim 1 in which said power plant means includes jet propulsion means, said force producing means being mounted to vary both the direction of the jet supplied by said propulsion means and the direction of the air flow on the inside of said annular wing.

12. An aircraft according to claim 1 having a fuselage mounted coaxially of said wing and spaced from the inner surface of the wing to provide a longitudinally extending annular streamlined passage of substantial cross-section through the annular wing.

13. An aircraft according to claim 12 in which the fuselage carries the power plant means.

14. In an aircraft according to claim 1, said power plant means being wholly located no further to the rear of the aircraft than the trailing edge of said annular wing.

15. A method of operating a flying machine, which machine comprises a lift producing structure substantially of revolution about its longitudinal axis and including an annular wing coaxial wtih the longitudinal axis and having longitudinally spaced leading and trailing edges, and having means to produce in normal flight a transverse force applied to said structure in a radial plane thereof fixed with respect thereto to give the longitudinal axis a constantly positive incidence relative to the trajectory of the aircraft, said lift producing structure and said force producing means constituting substantially the sole lift producing means of said machine, which method comprises the steps of imparting a thrust to the machine the intrinsic axis of which coincides with said longitudinal axis and which is balanced about at least one plane which includes said axis, and maintaining the longitudinal axis of the machine at a substantial positive angle of incidence with respect to the trajectory, the amount of thrust and the angle of incidence being sufficient so that said lift producing structure exerts a lift at least equal to the weight of the machine.

References Cited in the file of this patent

UNITED STATES PATENTS 2,595,504    Avery _____ May 6, 1952

FOREIGN PATENTS 726,969    Germany _____ Oct. 23, 1942
945,470    France _____ Nov. 29, 1948